United States Patent [19]

Spooner

[11] Patent Number: 4,909,611
[45] Date of Patent: Mar. 20, 1990

[54] LARGE ACTIVE SCREEN DISPLAY

[75] Inventor: Archer M. Spooner, Pangbourne, England

[73] Assignee: Systems and Simulation, Inc., Tampa, Fla.

[21] Appl. No.: 184,886

[22] Filed: Apr. 21, 1988

[51] Int. Cl.⁴ ............................................. G02F 1/01
[52] U.S. Cl. .................................................... 350/360
[58] Field of Search .............. 350/360, 361, 355, 356, 350/371, 374, 381, 382

[56] References Cited

U.S. PATENT DOCUMENTS

| | | |
|---|---|---|
| 2,169,838 | 8/1939 | Herbst . |
| 3,001,447 | 9/1961 | Ploke . |
| 3,233,040 | 2/1966 | Crane . |
| 3,345,462 | 10/1967 | Good et al. . |
| 3,504,117 | 3/1970 | Dueringer . |
| 3,796,480 | 3/1974 | Preston, Jr. et al. . |
| 3,877,791 | 3/1975 | Roach .................. 350/360 |
| 3,912,386 | 10/1975 | Gorog et al. ............. 350/361 |
| 3,990,783 | 11/1976 | Kohashi ................. 350/361 |
| 4,035,061 | 7/1977 | Sheridon ................ 350/360 |
| 4,087,810 | 5/1978 | Hung et al. ............ 350/360 X |
| 4,494,826 | 1/1985 | Smith .................... 350/360 |
| 4,779,963 | 10/1988 | Rhomberg ............. 350/360 X |

OTHER PUBLICATIONS

Gregory, D. A. et al., Optical Characteristic of a Deformable-Mirror Spatial Light Modulator, Optics Letters, vol. 13, No. 1, Jan. 1988, pp. 10-12.

Pape, D. R. et al., Characteristics of the Deformable Mirror Device for Optical Information Processing, Optical Engineering, vol. 22, No. 6, Nov./Dec. 1983, pp. 675-681.

*Primary Examiner*—Eugene R. LaRoche
*Assistant Examiner*—Nathan W. McCutcheon
*Attorney, Agent, or Firm*—Spensley Horn Jubas & Lubitz

[57] ABSTRACT

A display system suitable for large color television type images in which a thin membrane is charged electrostatically in a pattern corresponding to the image. The membrane is deformed locally by electrostatic force and the image is rendered visible by an optical arrangement in which the deformation varies the light transmitted through the display, the rear of which is illuminated.

18 Claims, 7 Drawing Sheets

LARGE ACTIVE SCREEN DISPLAY

BACKGROUND OF THE INVENTION

1. Field of the Invention

This invention relates to a large display suitable for color television type images in which a thin membrane is charged electrostatically in a pattern corresponding to the image, the membrane is deformed locally by electrostatic force and the image is rendered visible by an optical arrangement in which the deformation varies the light transmitted through the display, the rear of which is illuminated. More specifically, the invention is concerned with displays for home entertainment, flight simulation, tactical displays and other displays for which a large screen size is required that cannot be economically or conveniently provided by a shadow-mask color cathode ray tube (CRT).

2. Description of Related Art

Although CRT's having a screen diagonal of thirty-five inches to forty inches have been constructed, they are expensive, inherently have a large front to back dimension and are heavy because the glass walls must withstand the atmospheric pressure.

Of course, large television images are widely produced for many purposes by using one or more television projectors and a reflective screen. However, this general technique has the disadvantage that the projector must take up space right in front of the screen and also any object placed in the projected beam causes a shadow.

These inconveniences are augmented in the case of flight simulation by another problem: for good pilot training the distortion of the image as viewed by the pilot must be kept to a minimum and unless the projection axis and the line of sight are coincident this will not be the case. Since the pilot's head and the projector or projectors cannot be on the same axis, it is common practice to predistort the images, such that they appear correct to the pilot from his viewing position. However, this is done in the computer image generator (CIG) system connected to the projector and is (a) expensive and (b) leads to some loss of image detail.

A further problem in flight simulators using multiple projectors is cockpit shadowing; the projectors are normally disposed above the pilot's head, but if a large downward field of view is required (as with helicopter simulation), it is difficult to avoid having shadows cast by the front of the cockpit on the screen.

Yet another problem with systems having multiple projectors such as flight simulators is the maintenance of alignment between the individual images due to drift in the characteristics of electronic circuits. This can be overcome but is costly in either more elaborate projector circuits or increased maintenance time.

Some of the above problems can be overcome by using rear projection onto a translucent screen instead of front projection onto a reflective screen, but the overall system becomes very bulky, particularly with multiple projector systems.

It is an object of the present invention to provide a large color television type display in the form of a panel, for direct viewing, having a considerably reduced front to back dimension and weight compared with the CRT. For applications in which a larger display than for, say, home viewing is required, or where the image to be viewed must not be flat (as in a flight simulator where the complete image may have to at least partially enclose the pilot) several panels constructed according to the present invention may be used, butted together to give a continuous image substantially free from visible joins.

A further object of the invention, relevant particularly to multiple-panel systems, is to provide on each panel a geometrically correct image which cannot alter its geometry or color registration due, for example, to drift in electronic circuits.

SUMMARY OF THE INVENTION

In accordance with the present invention, these and other objectives are achieved by providing a large display suitable for color television type images in which a thin membrane is charged electrostatically in a pattern corresponding to the image, the membrane is deformed locally by electrostatic force and the image is rendered visible by an optical arrangement in which the deformation varies the light transmitted through the display, the rear of which is illuminated.

BRIEF DESCRIPTION OF THE DRAWINGS

A detailed description of a preferred embodiment of the invention will be made with reference to the accompanying drawings, wherein like numerals designate corresponding parts in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1A:
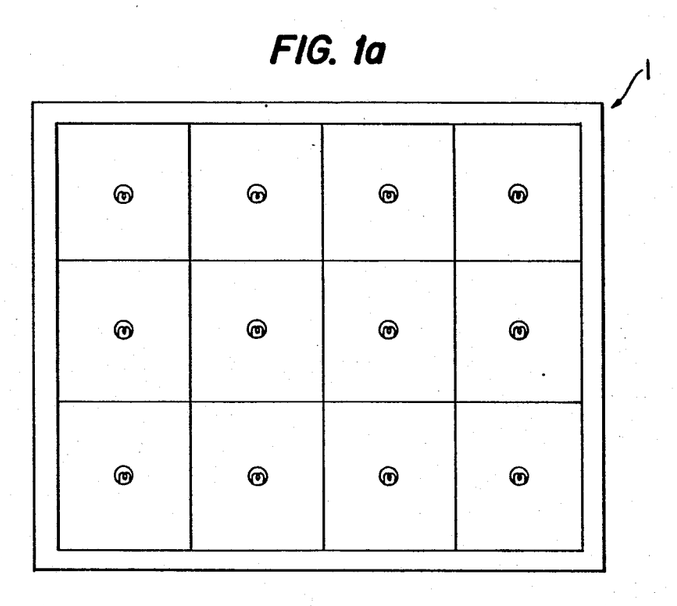
FIGS. 1a and 1b show a panel, in outline, according to a preferred embodiment of the invention.
Figure 1B:
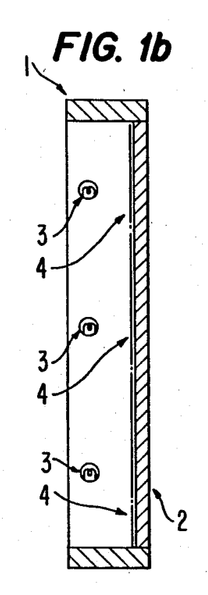

Referring now to FIGS. 1a and 1b, respective rear and side views of a panel according to a preferred embodiment of the invention are shown consisting of a frame 1, containing integrated circuits necessary for driving the panel, to be described later. Within the frame 1 is the active area, within which the image appears, consisting of a light modulating assembly 2. The light modulating assembly is substantially transparent and is illuminated from the rear by collimated white light. Various methods of achieving this are possible, but for illustration a set of compact filament lamps 3, such as automobile light bulbs, is shown, each positioned behind a Fresnel lens 4. The Fresnel lenses each consist of a square or rectangular sheet of transparent acrylic material carrying a molded pattern of grooves and each is spaced away from its corresponding lamp by its focal length such that the light rays passing through each lens are parallel and normal to the panel's front surface, that is the light is collimated. The lenses butt closely such that the whole of the light modulating assembly is illuminated without gaps.

It is generally important that the illumination of the panel be uniform and with the arrangement described there will be a tendency for the illumination to fall off at the edges of each Fresnel lens compared with its center. This effect may be overcome by using Fresnel lenses curved slightly so that each is concave towards the light source. An alternative is to replace the Fresnel lenses with solid acrylic aspheric lenses, but at the cost of extra weight. A hybrid arrangement having flat Fresnel lenses each with an acrylic thin meniscus lens round the corresponding light bulbs may also be used. Alternatively, a set of fiber optic guides may be used with a single powerful light source to distribute the light over the total area, acrylic lenses being used at the inputs and outputs of the fiber optic guides. Other alternatives will be further apparent to those of skill in the art and will not be discussed herein.

Figure 2A:
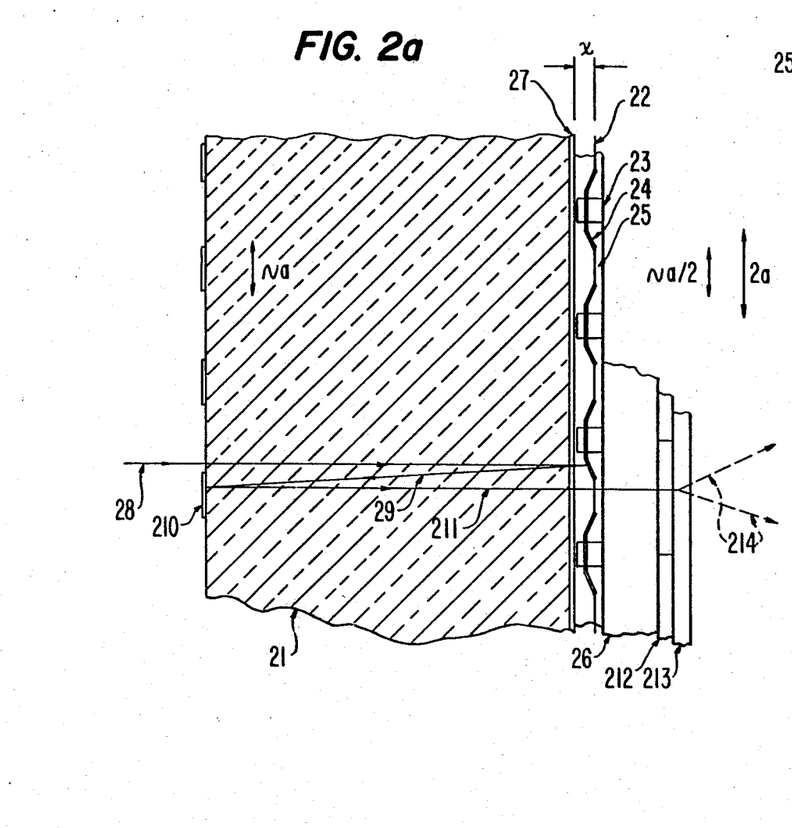
FIGS. 2a and 2b show an example of a light modulating assembly.
Figure 2B:
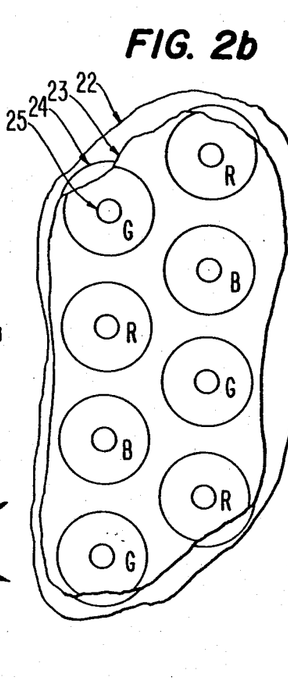

FIGS. 2a and 2b show in section a preferred embodiment of the light modulating assembly indicated as 2 in FIG. 1. A transparent substrate 21, which may be made of glass preferably not less than three mm thick and preferably not more than six mm thick on account of weight, is the main structural member of the light modulating assembly 2. An alternative material for the substrate 21 is methylmethacrylate (Dupont Lucite or Imperial Chemical Industries, UK., Perspex) at about half the weight of glass.

Spaced closely from the front surface of the substrate 21 is a thin transparent polymer membrane 22; a suitable material is polyester (Dupont Mylar or Imperial Chemical Industries, UK, Melinex) and the thickness is preferably a few microns. The membrane 22 is stretched uniformly to get it flat. It is to be noted that electrostatically deflected membranes are known, as for example in electrostatic speakers in which the attractive force moves the membrane to produce sound and also in various forms of television projector in which a charge image is deposited on a small membrane in an evacuated space, using an electron beam.

The membrane 22 may be mounted on the substrate 21 by means of an insulating spacer 23 which may be in the form of a thin insulating sheet of glass or polyester of overall dimensions equal to the active area of the display and having a regular pattern of holes, shown as having a diameter 2a, etched in it. As an example, the dimension 2a is about 1 mm for a panel 6.7 feet in diagonal used to display 525 line North American standard television. To clarify the method of operation, the curvature of the membrane 22 and its spacing are shown greatly exaggerated in FIG. 2a.

FIG. 2b indicates the preferred shape of the spacer 23 and shows the membrane 22 through it. The membrane 22 carries an aluminum coating on the front surface over the ring-shaped areas shown at 24 but has a non-aluminized circular area 25 at the center of each ring of diameter approximately a/2. An antistatic coating may be applied to both sides of the membrane 22 and to the spacer 23 to avoid unwanted buildup of charge on the membrane. A very slight conductivity, causing any unwanted charge to dissipate in a few seconds, is sufficient and has no effect on the required charging and discharging of the membrane surface.

An electrode structure 26 (to be described later), shown broken away but actually covering the whole active area of the display, may be used to deposit electric charge on the membrane 22 in a pattern corresponding to the television image and an electrostatic force is set up between the membrane 22 and a thin film transparent counterelectrode 27, deposited on the front face of the substrate 21. This electrostatic force causes local deflection of the membrane, each elementary circular area of membrane of diameter 2a taking up a curvature of approximately spherical shape, the radius of curvature varying from infinity for no deposited charge to a minimum figure corresponding to maximum deposited charge. A repulsive force with a suitable bias potential applied to counterelectrode 27 is assumed in FIG. 2a, but attractive force can also be used by modifying the configuration as in FIG. 7.

Each elementary circular area of the membrane 22 may be separately modulated and may be called a display element. For a monochrome display, each display element may be a picture element (pixel) as commonly understood. For a color display, three adjacent display elements may be arranged to modulate red, green and blue light respectively and together may constitute a pixel, as will be described.

White, collimated light enters the back of the substrate 21 and a particular ray 28 passes through the substrate and is reflected by the aluminizing of the membrane 22. Because the membrane 22 is deflected, the ray 28 is not returned in the same direction, but is deflected, the display element acting as a concave mirror. The deflected ray 29 impinges on a circular aluminized area 210 of diameter approximately equal to a. The circular aluminized area 210 is one of an array of such areas forming plane mirrors aligned with the display elements. The plane mirror 210 produces a reflected ray 211 which passes through the non-aluminized circular area 25 of the display element, through the electrode system 26 and emerges from the front of the panel.

It will be appreciated that when the display element is undeflected it becomes a plane mirror, and as the plane mirror 210 is larger in diameter than the non-aluminized circular area 25 of the membrane 22, no light can emerge from the front of the panel. As the display element increases in curvature in accordance with increased charge deposited on it, more light is passed through the system.

The maximum condition occurs when the membrane mirror focuses the collimated light back on to the non-aluminized area 25, and if the thickness of the substrate 21 is t, this occurs when $$t = \mu f/2 \qquad (1)$$

where f is the focal length of the membrane mirror and $\mu$ is the refractive index of the substrate. Since the radius of a spherical concave mirror, R, is 2f $$R = 4t/\mu \qquad (2)$$

The radius of curvature, R, of the display element can further be related to the deflection, $\delta$, of its center from the flat condition by geometry $$\delta = R - \sqrt{R^2 - a^2} \quad (3)$$

Thus, by applying equations (2) and (3) to a display element of given diameter $2a$ and a substrate of thickness t and refractive index $\mu$, the required deflection $\delta$ of the display element's center for full modulation can be calculated.

To calculate the required voltage on the membrane 22 to deflect it, use may be made of the formula for the force per unit area between two charged plates (see Duffin, W.J., "Electricity and Magnetism", McGraw Hill (1980).

$$q = \frac{\epsilon_o a V^2}{2x^2} \quad (4)$$

where
$\epsilon_o$ = electric constant, $8.854 \times 10^{-12}$ F/m
V = voltage between charged surface of membrane 22 and counterelectrode 27
x = separation of charged surface of membrane 22 and counterelectrode 27

Next, the force per unit area applied to the membrane may be related to the membrane characteristics as follows (Timoshenko, S., "Strength of Materials", Part II, 1936, Van Nostrand).

$$\delta = 0.662 \left( \frac{qa^4}{Eh} \right)^{1/3} \quad (5)$$

where
q = force per unit area
a = radius of membrane
h = thickness of membrane
E = Young's Modulus for the membrane material.

From equations (4) and (5), by substituting (4) in (5), the voltage V can be obtained as a function of $\delta$, E, h, $\epsilon_o$ and x.

Given the value of $\delta$ for a practical substrate thickness, t, in the range three to six mm, the membrane thickness, h, should preferably be a few microns (as for food wrapping film) and the voltage in the range fifty to one hundred volts, for a membrane/counterelectrode spacing in the five to ten micron range.

For a color display it is preferable to mount a color filter 212 over the whole display, having an array of red, green and blue transparent areas aligned with the display elements. The preferred relative orientation of the colored areas is shown in FIG. 2b by the letters R (red), G (green) and B (blue), the three primary colors. This orientation ensures that at any position in the display, any three adjacent display elements form a triad of red, green and blue components. The same arrangement is used in the usual shadowmask color cathode ray tube for the phosphor dots that produce the image. The size of each colored area in the color filter should preferably be, as a minimum, circular and of diameter $2a$, but to aid registration with the membrane may be made larger such that the colored circular areas just touch, or may be made hexagonal in shape so that no blank areas exist between them.

Color filters of the type described are well known, in particular for use with liquid crystal displays. Various means to give the color are also known, including, for example, dyes (as in a photographic film) and deposition of thin films causing light interference at different wavelengths dependent on thickness.

Since the light passing through the color filter 212 may be strongly collimated, viewing of the panel may only be possible from one precise position and the panel may appear dark from all other positions. To make it possible to view the panel normally, some degree of diffusion should preferably be introduced and a diffusing sheet 213 may be mounted over the color filter 212 to give emerging rays 214. The diffusing sheet may be constructed by conventional methods, the simplest being to provide a slightly roughened transparent acrylic sheet. For more precise control of the angle over which the display may be seen, various types of embossed patterns are well known. For flight simulation a small degree of diffusion is appropriate as the pilot's head is relatively fixed but for general viewing for a group of people, more diffusion is desirable.

In describing FIGS. 2a and 2b reference has been made to the membrane and to the optical arrangements to make the deflection visible in the form of a colored image, but the charging of the membrane has not been described except to state that it is achieved by the electrode structure 26 This electrode structure 26 should preferably be capable of generating and depositing electric charge in the form of positive or negative ions on each display element and then, after a television picture (frame) period, removing it again in time for the next charging cycle.

Each display element has a set of electrodes associated with it, capable of generating and controlling ions, and following the usual practice in most display technology (apart from the cathode ray tube), addressing may be by row and column conductors. This generally means that the sets of electrodes are connected together by conductors running horizontally (rows) and vertically (columns) and only when the appropriate voltages are applied to both a row and a column conductor is the set of electrodes at the intersection energized. The alternative arrangement of running a separate set of conductors to each set of electrodes would be much more cumbersome.

The preferred electrode arrangement is somewhat similar to that used for a plasma display panel (PDP), which gives a display using an inert gas which is ionized and made to glow at the intersections between row and column conductors. Available PDP's give large bright displays but cannot satisfactorily show large color television images. The gas widely used in PDP's is neon. To minimize the electrode voltages required for ionization a small amount of argon is normally added, to give the so-called Penning mixture, producing an orange glow.

In the present invention, unlike known plasma display panels, light output from the gas is not required and the use of argon, or a suitable mixture of inert gasses containing argon, is preferred. A gas pressure near but somewhat below atmospheric is preferred, to minimize the compressive force of the atmosphere on the panel. The characteristics of ionization in gases are such that very strong non-linearity of the current/voltage characteristic is exhibited. Therefore, when a given electrode set is energized, there is no problem with partial energizing of neighboring display elements, as occurs with other technologies such as liquid crystal displays.

Another feature of the current/voltage characteristic is that unless some means is taken to limit the current, a large current will pass, destroying the electrodes. Various methods may be used to limit the current, in particular a series resistor or a series capacitor. Each gap between electrodes must have its own resistor or capacitor, as if current limiting is provided for a group of gaps, the distribution of current will be very uneven, one gap usually taking most of the current. It will first be assumed that resistors are used to limit the current, a thin film resistor being incorporated in series with each column or each row electrode.

Figure 3A:
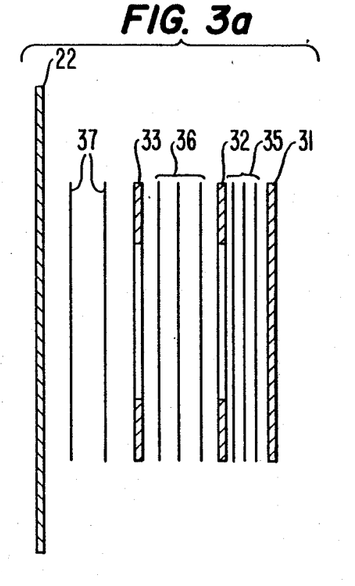
FIGS. 3a, 3b and 3c show the principle of operation of a preferred set of electrodes for charging the membrane.

FIG. 3a shows the functional components of one set of electrodes, associated with one display element. There are three electrodes, a disc-shaped row electrode 31, a ring-shaped column electrode 32, and a ring-shaped video electrode 33. The membrane to be charged is shown at 22. The space is filled with an inert gas capable of being ionized by applying appropriate voltages between the row electrode 31 and the column electrode 32.

To explain the operation of the set of electrodes associated with each display element, the electric field between the electrodes should be described. This is normally done by reference to equipotential surfaces which show how the electric potential varies between electrodes, close spacing of equipotential surfaces corresponding to a high field and wide spacing to a low field.

In FIG. 3a approximately planar equipotential surfaces 35 are shown between electrodes 31 and 32. The field is sufficient to cause a discharge in the space, generating positive and negative ions. Suppose that row electrode 31 is held at a positive voltage relative to column electrode 32, negative ions will move to electrode 31 and positive ions towards electrode 32. Suppose now that the video electrode 33 is held more negative than column electrode 32, positive ions will be attracted towards it, the field being indicated by equipotential surfaces 36. If now the surface of the membrane 22 is more negative than the video electrode 33, as shown by equipotential surfaces 37, positive ions will be attracted to the membrane 22 and deposited on it, leaving the surface of the membrane 22 positively charged. If, on the contrary, the membrane 22 is initially positive with respect to electrode 33, which is positive with respect to electrode 32, which is positive with respect to electrode 31, negative ions will be transported through the electrode set, depositing negative charge to the membrane 22.

The three electrodes 31, 32, 33 comprise an ion lens system, analogous to an electron lens used in a cathode ray tube. The extraction of ions from an ionization region for charging an insulating surface is known in some forms of electrostatic printing, in which an insulating drum is charged and used to deposit toner on a paper sheet.

Figure 3B:
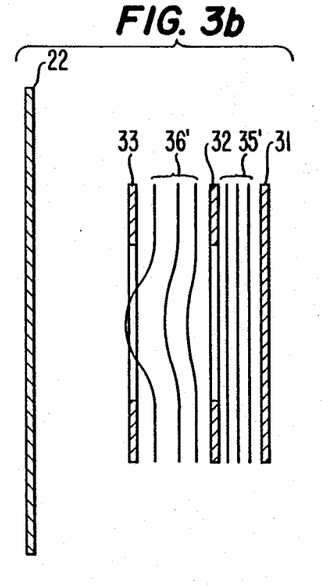

FIG. 3b shows what happens when the membrane 22 has charged up. When the surface of the membrane 22 has risen to the same potential as the video electrode 33, the field between them disappears (no equipotential surfaces are shown). In the absence of a field no further ions are attracted to the membrane 22, and its potential has been set to that of the video electrode 33. The equipotential surfaces 36' bow out into the field-free space between the video electrode 33 and the membrane 22, but this does not adversely affect the operation. The principle of setting the potential of an insulating surface equal to that of a nearby electrode in the presence of a flow of ions is well known in electrostatic printing.

Figure 3C:
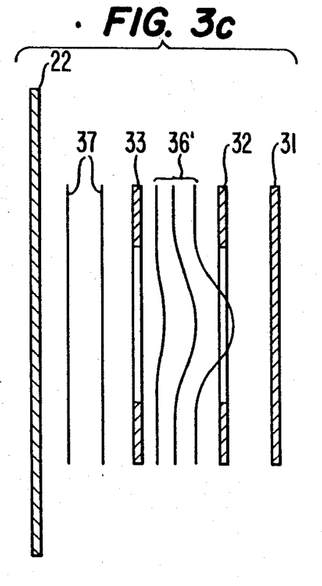

FIG. 3c shows the conditions in the electrode set when the potential of the row electrode 31 is made equal to that of the column electrode 32. There is now no field between the row electrode 31 and the column electrode 32 (no equipotential surfaces shown) and no ionization occurs so that no charge is deposited on the membrane 22 even if a field (shown by equipotential surfaces 37) exists between the membrane 22 and the video electrode 33. The equipotential surfaces 36' bow into the space between the row electrode 31 and the column electrode 32, but this does not adversely affect the operation.

In the above description of the working of the electrode set, the ionization takes place between the row electrode 31 and the column electrode 32. It is to be noted that the electrode set can also work with the rows connected to electrode 32 and the columns connected to electrode 31, with appropriate applied voltages.

All the display elements/electrode sets in a (horizontal) scanning line are preferably addressed in parallel, a common practice known as line-at-a-time addressing. This has the advantage, in the present invention, that the whole line scan period (typically 63.49 microseconds in the North American 525-line television system) is available for removing the old charge and then building up the new charge, whereas if addressing where done a pixel at a time, only a fraction of a microsecond would be available.

Figure 4:
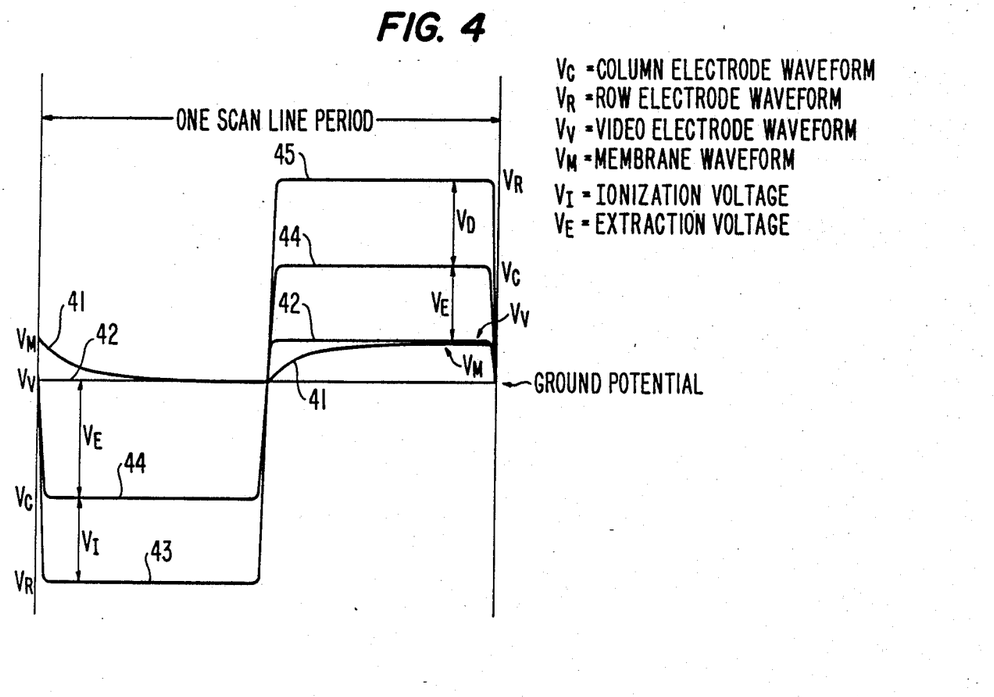
FIG. 4 shows the waveforms which may be used with the electrodes.

FIG. 4 presents the voltage waveforms associated with the charge/discharge cycle of a single display element. In the left-hand part of FIG. 4 the voltage 41 on the membrane is shown starting at a positive value and the video electrode voltage 42 is shown at ground potential. The row electrode waveform 43 is most negative, the column electrode waveform 44 being intermediate between that of the row and the video electrodes (this is the condition shown in FIG. 3a).

The potential difference between the row electrode waveform 43 and the column electrode waveform 44 is chosen to give ionization in the gas used in the system, with sufficient voltage in hand to prevent erratic functioning; a typical figure is between one hundred and one hundred fifty volts. The potential difference between the column electrode voltage 44 and the video electrode voltage 42 is chosen to provide a satisfactory extraction voltage to extract negative ions from the ionized volume and direct them towards the membrane. The value of the extraction voltage depends on the design of the electrode set, but typically has a value in the range of one hundred volts to two hundred volts.

As the ionization continues, the membrane surface voltage 41 decreases to ground potential, setting the display element ready to receive a charge representing the light intensity required in the displayed television picture. The right-hand part of FIG. 4 shows the membrane being charged up. Although the left and right parts of FIG. 4 are shown as having the same duration, this is not a necessary feature of the invention and the two parts may occupy unequal times, the ratio of times for optimum performance being dependent on such factors as the ionic mobility of negative and positive ions for the gas mixture chosen.

In the right-hand part of the FIG. 4 the row waveform 43 is most positive and is set above the column electrode waveform 44 so that ionization again takes place in the gas, generating in this case positive ions. The video electrode waveform is set to a level representing the required light intensity, ground potential representing black level. The membrane waveform 41 rises until it reaches the same level as the video waveform 42. Thus, during each line scan period, the display element is first set to black level and then to the required level, where it remains for one picture (frame) period (typically 1/30 second for North American broadcast standards and 1/25 second for European broadcast standards).

As previously stated, the description of FIG. 3 is based on the use of resistors for current limiting. An alternative is to use a capacitor, formed by depositing a thin layer of dielectric on each electrode. In FIG. 3 the dielectric layer would be on the inner surfaces of the row electrode 31 and the column electrode 32. The operation of the electrode set is still illustrated by FIG. 4, but the additional feature would be the deposition of charge on the inner surfaces of the row and column electrodes. Capacitor limiting is used in so-called A.C. plasma display panels, where the charge on the dielectric-covered electrodes gives what is known as the "wall voltage". The wall voltage always opposes the ionization voltage, such that ionization is quenched once the charge has built up fully. In the left-hand part of FIG. 4 the membrane voltage 41, is reduced to ground potential as for the resistor-limited case, but the ionization then quenches instead of continuing at constant current for the duration of the negative excursions of the row waveform 43 and the column waveform 44. Charging of the membrane in the right hand part of the FIG. 4 follows the same pattern. As in an AC PDP, when the row and column electrode voltages change polarity, to reverse the direction of ionization, the stored wall voltage adds to the (reversed) potential difference between the row and column electrodes such that ionization occurs with a smaller voltage than is required for the resistor-limited case.

Following normal practice with AC PDP's, some form of priming is provided for the ionization which should occur at each row/column intersection. The onset of ionization in an isolated gap can vary considerably in time of onset and required voltage, but consistent operation at a definite voltage occurs when a very small amount of ionization is introduced to prime the main ionization. AC plasma panels have priming from pilot cells located around the perimeter of the display. These cells are kept operating (and can be fired initially by using increased voltage) and emit ultraviolet light which travels through the largely transparent structure to give sufficient ionization throughout. It is to be understood that for the display which is the subject of the present application to operate optimally, priming should be provided in accordance with normal practice.

The ability to control the light passed through each display element over a range from substantially zero to a maximum amount without visible steps in the brightness of the viewed image is one important advantage of the invention, and makes possible a television display as opposed to other forms of display such as alphanumeric and diagrammatic displays.

Figure 5A:
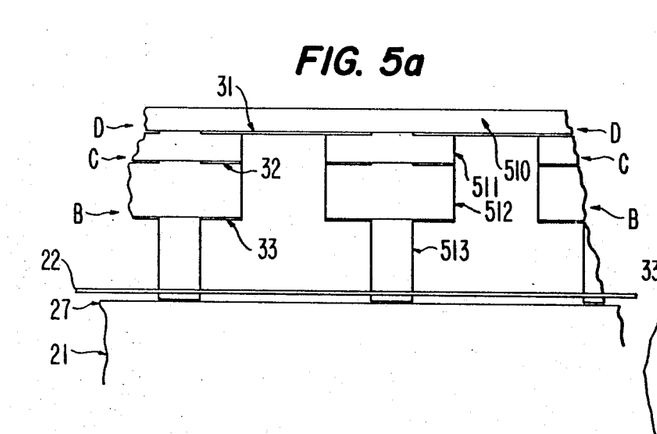
FIGS. 5a, 5b, 5c and 5d show an example of the physical embodiment of the electrode structure.

FIGS. 5a through 5d show a physical embodiment of the electrode structure of which FIG. 3 gives the essential features of one set of electrodes. In FIG. 5a the membrane 22 is now shown flat, and with small clearance from the substrate 21, as the membrane deflection is in practice small and the membrane is closely spaced from the counterelectrode 27, which is a thin film deposited on the substrate.

The electrode system is made from four transparent insulating layers 510, 511, 512, 513, carrying conducting transparent thin films. Suitable materials for the insulating layers are glass or polyester film; polyester film may be used in the well-known multiple-layer flexible printed circuit technique where layers of film carrying patterns of metalizing are bonded together. A suitable material for the transparent conducting layers is indium tin oxide (ITO) which bonds well to glass and to various polymers including polyester. Capacitor limiting of ionization current is used, a thin insulating, dielectric layer being deposited on the inner surface of the row electrode 31. The column electrode 32 is sandwiched between the insulating layers 511 and 512 and does not require a dielectric layer. The ionization current passes between the exposed edge of the column electrode 32 and the neighboring parts of the row electrode 31.

Figure 5B:
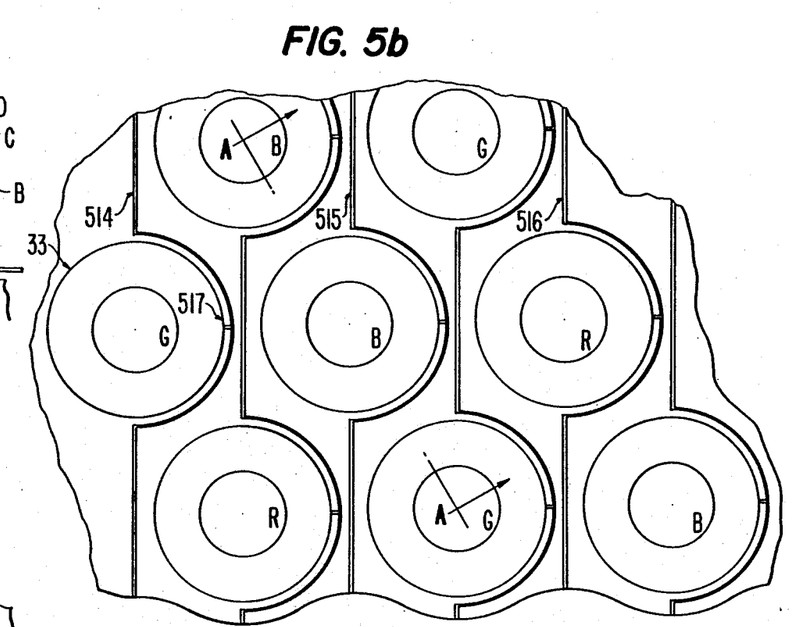
Figure 5C:
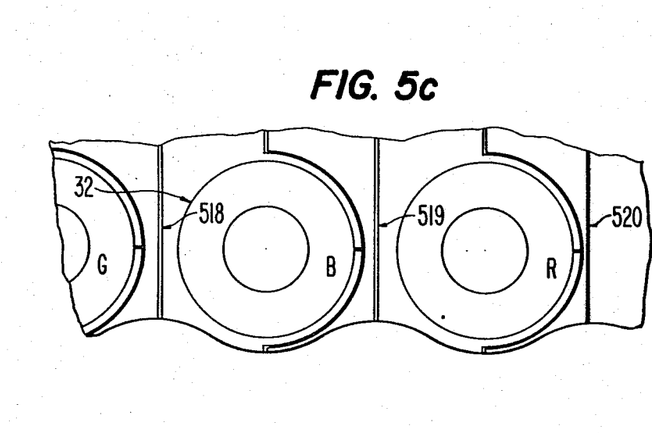
Figure 5D:
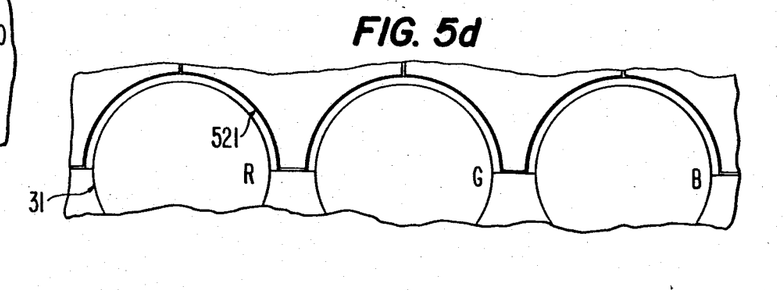

FIG. 5a is a cross section taken along the line AA in FIGS. 5b, 5c and 5d and is drawn at an angle to show the closest spacing of an adjacent pair of electrode sets. The row electrodes 31 are discs of ITO or similar material and the column electrodes 32 and the video electrodes 33 are rings of ITO, all the electrodes being deposited on the insulating layers.

FIG. 5b shows the structure to the left of the line BB of FIG. 5a which includes the video electrodes 33, the conductors 514 for connecting the video electrodes 33 which control the green picture information, the conductors 515 for connecting the video electrodes 33 which control the blue picture information, and the conductors 516 for connecting the video electrodes 33 which control the red picture information. The conductors are preferably thin films of deposited metal, for example aluminum, joining the transparent conducting electrodes. Conductors of ITO are preferably not used for a large panel because the resistance would be too high. The video electrodes 33 are connected to the conductors by overlapping the ITO and metal as at 517. The conductors are brought out to the horizontal edges of the panel giving connections to the red, green and blue video electrodes.

FIG. 5c shows the structure to the left of the line CC in FIG. 5a, which includes the column electrodes 32, conductors 518 for connecting the column electrodes 32 controlling the red information, conductors 519 for connecting the column electrodes 32 controlling the green information, and conductors 520 for connecting the column electrodes 32 controlling the blue information. The structure shown in FIG. 5c is substantially identical to that of FIG. 5b but situated between the insulating layers 511 and 512, whereas the structure of FIG. 5b is situated between the insulating layers 512 and 513. Duplication of the structure is preferable because, as has been explained, the column electrodes 32 should be driven to a fixed potential to cause ionization of the gas (in cooperation with the row electrodes 31) and then the appropriate amount of charge, varying with the video waveform, is extracted by applying the appropriate voltage to the video electrodes 33.

FIG. 5d shows the structure to the left of the line DD in FIG. 5a, which includes the row electrodes 31 and the conductors 521 connecting the row electrodes together. The conductors 521 are brought out to the vertical edges of the panel.

Now that FIG. 5 has been explained, it is possible to be more explicit as to the preferred method of addressing of the panel. It has already been mentioned that line at a time addressing is used. As in a shadowmask cathode ray tube, the image is made up of red, green and blue dots arranged in triads and this means that two rows are preferably addressed simultaneously. All other rows should be switched off, and this is achieved by setting the amplitude of the row waveform 43 in FIG. 4 equal to the column waveform 44, so that no ionization takes place. It is to be understood that making the row and column voltages exactly equal is not necessary, as long as ionization in the gas does not take place. To address the panel in accordance with television broadcasting scanning standards in which line interlacing is used to reduce flicker, the sequence is: address the top two rows, leave out the third and fourth rows, address the fifth and sixth rows, leave out the seventh and eighth rows, and so on, followed by the third and fourth rows, the seventh and eighth rows, and so on.

The electronic circuits for electronically driving the panel are described next, with reference to FIG. 6. A 525-line television picture is assumed. The panel 1 has connections brought out to its edges from the conductors running vertically and horizontally. The vertical connections are: red, green and blue video and red, green and blue columns. The horizontal connections are the rows. All the column conductors are connected in parallel, since selection of which display elements are operative is by the row conductors.

It will be apparent that the driving of the panel which is described in the present application has several aspects in common with the driving of a plasma display in accordance with normal practice. In fact, in some respects certain embodiments of the invention may be conceptualized as a form of plasma display panel in which the ionization of the gas does not generate light for making the image but produces electric charge for deflecting the membrane. Accordingly, available integrated circuits are largely applicable to such embodiments, and only a brief description of one particular method will be given.

Figure 6:
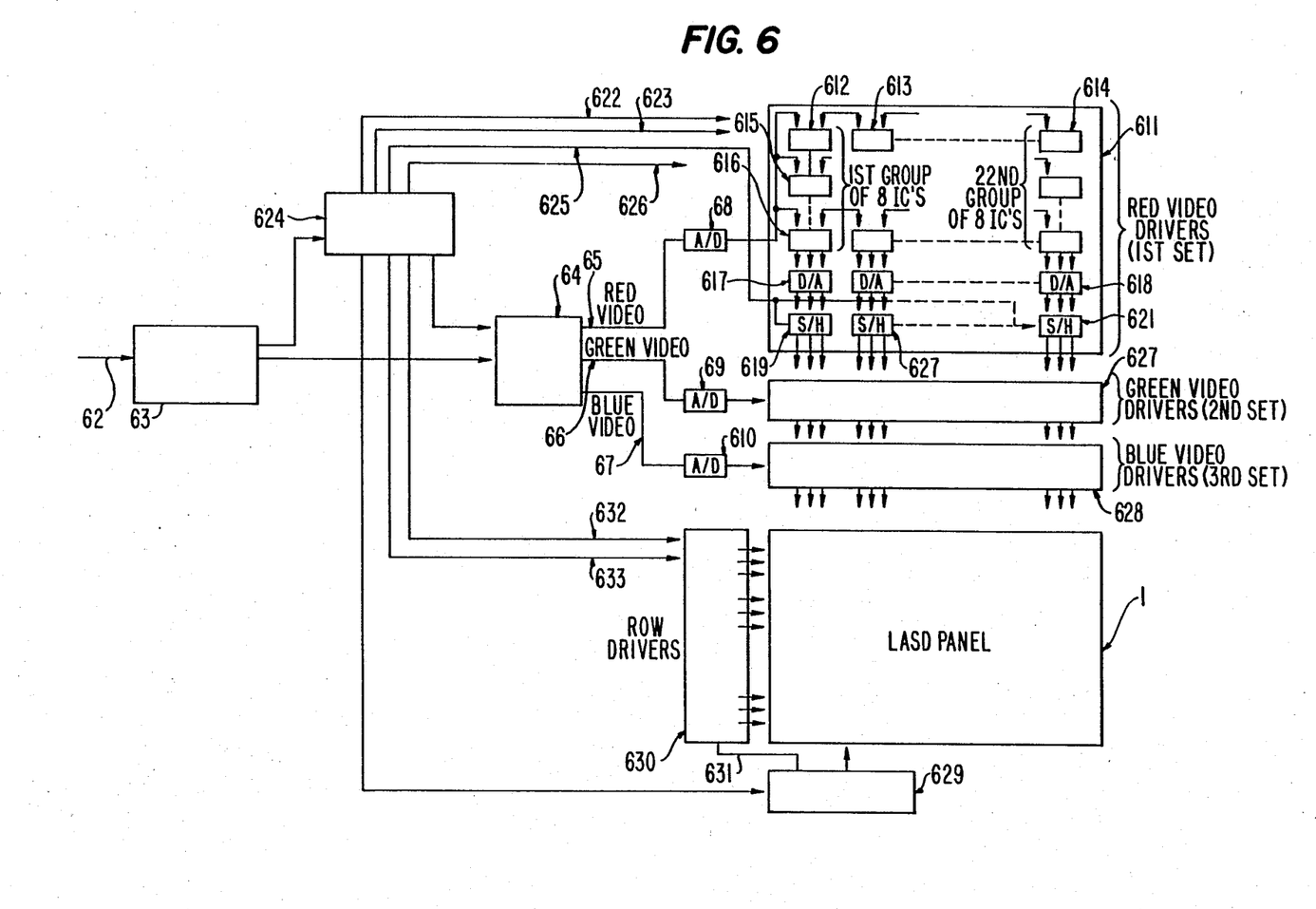
FIG. 6 shows the preferred electronic circuits for driving the panel.

With reference to FIG. 6, the video waveform 62, entering on the left, is passed to a synchronizing separator 63 which sends (a) a composite synchronizing waveform to a pulse generator 624 to enable the various driving pulses to be generated, and (b) video without synchronizing to a red, green, blue separator 64 to provide separate video waveforms for red 65, green 66, and blue 67. These three analogue waveforms are passed to three analogue to digital convertors 68, 69 and 610, which provide an eight-bit digital version for each of the three video signals, in parallel format (eight wires plus ground).

The red video drivers will now be described as shown in the block 611. The first bit is fed to a thirty-two bit shift register 612 whose output feeds a second similar shift register 613, which feeds further shift registers, the total number of shift registers being twenty-two. The parallel outputs of all these shift registers give the level (zero or unity) of the first bit of the red video for all the red display elements in one television line. The second bit of the red video waveform is fed to shift register 615, which feeds further shift registers, the total number again being twenty-two. A similar arrangement exists for bits three through eight, the first shift register for the eighth bit being shown at 616.

The outputs from all the shift registers are fed to twenty-two digital to analogue convertors of which the first is shown at 617 and the last at 618. Each of the digital to analogue convertors sums the eight bits to give an analogue value for each of thirty-two display elements, the total number of parallel outputs from the digital to analogue convertors being 22×32=704. During each active television line period of 52.69 microseconds, video information is read into the shift registers and during the line blanking period of 10.8 microseconds it is extracted, in parallel format, into a set of twenty-two sample and hold circuits, of which the first is shown at 619, the second at 620, and the last at 621. Control pulses 622 to clock the shift registers and further control pulses 623 to inhibit input to the shift registers during line blanking are generated in the pulse generator 624 which receives composite synchronizing signals from the synchronizing separator 63.

The sample and hold circuits have to accept the voltage samples during line blanking and then maintain the values during the active line period while a new television line is being clocked into the shift registers, so their inputs must be disconnected from the digital to analogue convertors during the active line period; this gating function requires a line blanking pulse 625 generated in the pulse generator 624.

Furthermore, the video waveform to be fed to the panel itself is of the form shown in waveform 42 of FIG. 4, that is, ground potential for the first half of the scan period and set to the sampled and held value for the second half. A simple gating circuit (not shown) operating on the sample and hold outputs and driven by a square wave pulse 626 having on and off periods both equal to half the line period is required for this and is produced in the pulse generator 624. To drive the active conductors in the panel, special high voltage integrated circuits are used, typically of Double-Diffused Metal Oxide Semiconductor (DMOS) construction as are sold by Texas Instruments for display panel use. The above description for the red video drivers applies also to the green 627 and blue 628.

Turning now to the column driving arrangements, FIG. 6 shows a circuit block 629 containing a single high power, high voltage transistor circuit which is connected to all the column conductors in parallel. The waveform is that of waveform 44 in FIG. 4.

The row driving waveform, for those rows which are to be energized, is shown as waveform 43 in FIG. 4. For the rest of the rows, the waveform is identical with that of waveform 44, the column waveform. The method of obtaining this result is to generate a waveform equal to waveform 43 minus waveform 44 and add this to waveform 44 for the two selected rows, the rest of the rows being simply fed with waveform 44. In FIG. 6, block 630 is a circuit block concerned with generating this difference waveform and feeding it in turn to adjacent pairs of rows. Block 630 is connected to block 629 by a link 631 which has the effect of adding the difference waveform to the column waveform generated by block 629.

The block 630 is of conventional construction for addressing plasma display panels, consisting of a set of shift registers, feeding high voltage outputs connected to pairs of row conductors. Block 630 requires, from pulse generator 624, (a) clocking waveform 632 which moves a "one" from start to end of the shift registers, line by line, and is a line frequency pulse and (b) reset waveform 633 which is of twice picture frequency and initiates downward movement of energized pairs of rows.

The FIGS. 1 through 6 and the preceding portions of the specification provide a description of a preferred embodiment of the invention. Some alternative embodiments of the invention will now be described.

Figure 7:
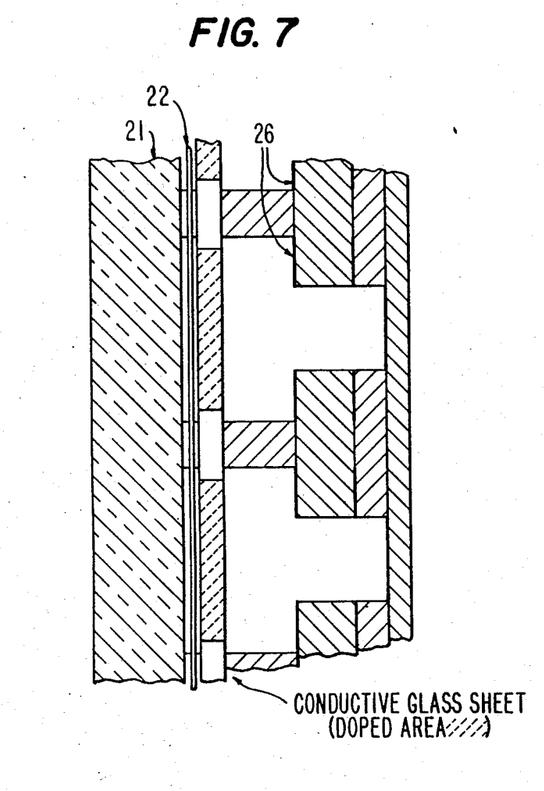
FIG. 7 shows an alternative method of deflecting the membrane.

The arrangement shown in FIGS. 2 and 5 is suitable for repulsion of the membrane 22 from the counterelectrode 27 to get the deflection concave towards the plane mirrors 210, as is required. An alternative to FIG. 5 is shown in FIG. 7 where a thin glass sheet is interposed between the electrode system 26 and the membrane 22. The glass sheet is doped with a suitable material such as a metal to make it slightly conductive, the doped areas being circles aligned with the display elements, as shown. The charge is deposited on the glass and travels through it, giving a charged surface close to the membrane 22 and replacing the counterelectrode 27 in FIG. 5. As with the arrangement of FIG. 5, antistatic coatings may be used on the membrane 22 and on the spacer (shown as element 23 in FIG. 2) to prevent unwanted buildup of charge.

A feature of the embodiment of FIG. 7 is that the ions generated cannot contact the membrane 22. This may be advantageous in some designs according to the invention in which some undesired effect would otherwise occur on the surface of the membrane 22, such as change in physical properties or release of substances that might contaminate the gas in the ionization qap to increase the ionization potential and possibly extinguish the ionization.

Figure 8:
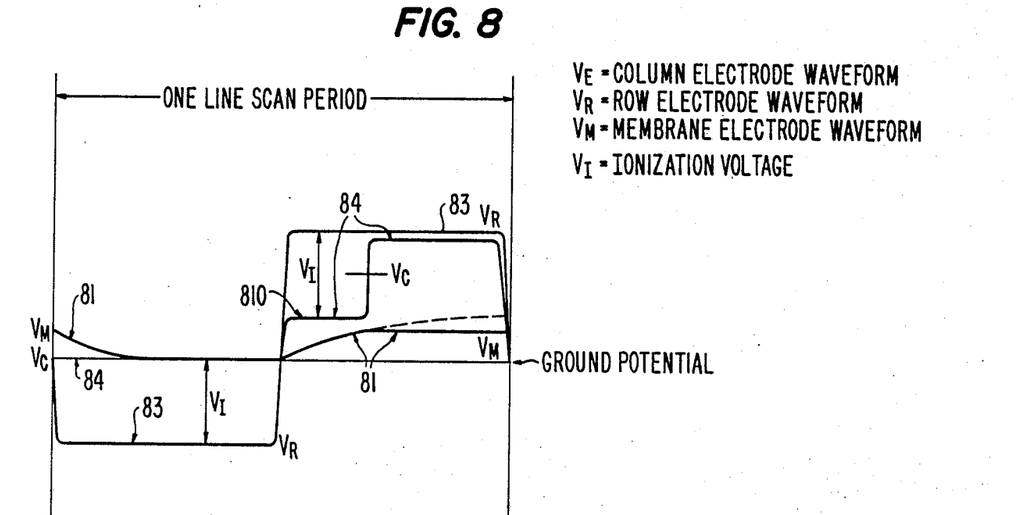
FIG. 8 is a waveform diagram corresponding to the membrane deflecting method of FIG. 7.

An alternative embodiment for the electrode system 26 will next be described in which, instead of using a video electrode 33 to vary the extraction of ions from the ionized gas, the duration of ionization is varied, giving so-called duty cycle modulation. Referring to FIG. 3, the video electrode 33 is eliminated and an appropriate waveform is applied to the column electrode 32 to initiate and terminate ionization. FIG. 8 is the waveform diagram (corresponding to FIG. 4) in which, at the left-hand side, the membrane voltage 81 is shown starting at a positive voltage and decreasing to ground potential owing to ionization between the column electrode 32 (waveform 84, at ground potential) and the row electrode 31 (waveform 83, set more negative than 84 by the ionization of voltage, $V_I$). The membrane 22 stabilizes at ground potential, as explained with reference to FIG. 4, due in this case to the proximity of the column electrode 32.

In the right-hand part of FIG. 8, the row electrode waveform 83 becomes positive and the column electrode waveform 84 rises to a positive value 810 equal to the maximum desired positive excursion of the membrane voltage 81. The row electrode waveform 83 is positive with respect to the column electrode waveform 84 by the ionization voltage $V_I$, so that ionization takes place, charging the membrane, as shown by membrane voltage waveform 81.

The diagram is drawn to show the case where a video voltage less than maximum is required. The membrane charging process is stopped by driving the column electrode voltage positive to a value near that of the row electrode, so terminating ionization and leaving the membrane voltage set at a particular value for the rest of the line scan period. By varying the time when the column electrode waveform 84 suddenly goes positive, the membrane voltage at the end of the line scan period can be set to any value from zero (ground potential) to a maximum figure.

The physical embodiment of an electrode structure operating in accordance with FIG. 8 is very similar to the structure shown in FIG. 5 except that the insulating layer 512 and the video electrodes 33 are omitted. The column electrodes 32 are connected together into red, green and blue groups as shown in FIG. 5b and 5c. The row electrodes 31 are connected together as in FIG. 5d.

The panel according to the invention with the duty cycle modulation method as just explained is approximately in accordance with FIG. 6 with the common column driver 629 removed and the red, green and blue drivers connected to the column conductors through a set of voltage-to-pulse-width convertors. Such a convertor, well known in electronics, as adapted for the present purpose, comprises (a) a linear sawtoothed waveform generator, triggered once per television line scan (b) a voltage coincidence detector which gives an output when the sawtoothed waveform reaches an input voltage (in this case, the video voltage) and (c) a pulse generator giving a pulse commencing at the moment the coincidence detector detects coincidence and terminating at the end of the line scan period. The output of the convertor has the form of the part of the column electrode waveform 84 that is more positive than voltage 810.

The complete column electrode waveform, as shown in FIG. 8, has a first part at ground potential, a second part at the maximum voltage above ground required for the membrane and a third part above ground by the sum of the maximum video voltage and the ionization voltage. The complete column waveform for each display element is produced by adding together the convertor waveform for that display element and the output of a square wave generator having the line scan repetition frequency, a negative portion of amplitude $V_I$ and a positive portion having an amplitude of the maximum video voltage. This square wave generator is driven from the pulse generator 624 and has a power transistor output.

The row driving waveform, for those rows selected, is shown in FIG. 8 at 83. This waveform is generated by a circuit block, as at 630 in FIG. 6, and fed in turn to adjacent pairs of rows.

The duty cycle modulation embodiment of the electrode structure has the advantage of greater simplicity of the panel at the expense of additional circuit components.

An alternative embodiment of the method of deflecting the membrane will next be described, using a piezoelectric membrane. As is well known, a piezoelectric material changes its shape when subjected to a voltage, and thin, transparent film of polyvinylidene fluoride (PVDF) polymer is available in which a voltage applied through the film thickness causes expansion in one or both of the other axes. These films can be readily coated with thin metallic layers and are used for microphones, stereo pickups, speakers and sensors.

The deposition of charge is carried out by one of the methods already discussed, and the optical arrangements are the same. It is necessary in using a PVDF membrane, to have the voltage causing deflection applied across the membrane thickness over the whole area of the display element, which means that there must be a conducting coating on both surfaces. There should be a ring-shaped area of opaque metallizing (24 in FIG. 2) for optical reasons and to this should be added a transparent, conductive coating on both front and back surfaces. One of these surfaces should be connected to a fixed potential (for example, ground) and the other should have the video voltage applied to it.

The PVDF membrane is made from the type of film in which the expansion is equal in both axes in the surface, causing a bowing of the disc of membrane forming the display element into approximately spherical shape when the voltage is applied. It must be noted that this bowing can occur in either a positive or a negative direction and this will give rise to instability unless some constraint is applied, either mechanical or electrical. The preferred method of overcoming this instability is to provide a small video bias, insufficient to cause light transmission through the panel, but sufficient to prevent some display elements deflecting in the wrong direction.

Considering now the charging method of FIG. 5, the charge lands directly on the membrane. The left-hand side of the membrane must be connected to a fixed potential, say ground, and this is done by contact with the counterelectrode 27. Although the counter-electrode is made of ITO and so cannot support a current sufficient for feeding an electrode from which ionization occurs, the PVDF membrane does not draw continuous current and so ITO is acceptable. The deflection of the membrane is in the direction shown in FIG. 2.

With the charging method of FIG. 7, the right-side of the PVDF film display element is connected around its circumference to the conductive area of the glass sheet, so that the required voltage is applied. The left-hand side is connected to a counterelectrode (not shown in FIG. 7) in the same way as for FIG. 5a. For both charging methods, the transparent conductive coating on the membrane may be continuous on the left-hand side, but limited to circular areas, one per display element, on the right-hand side.

Figure 9:
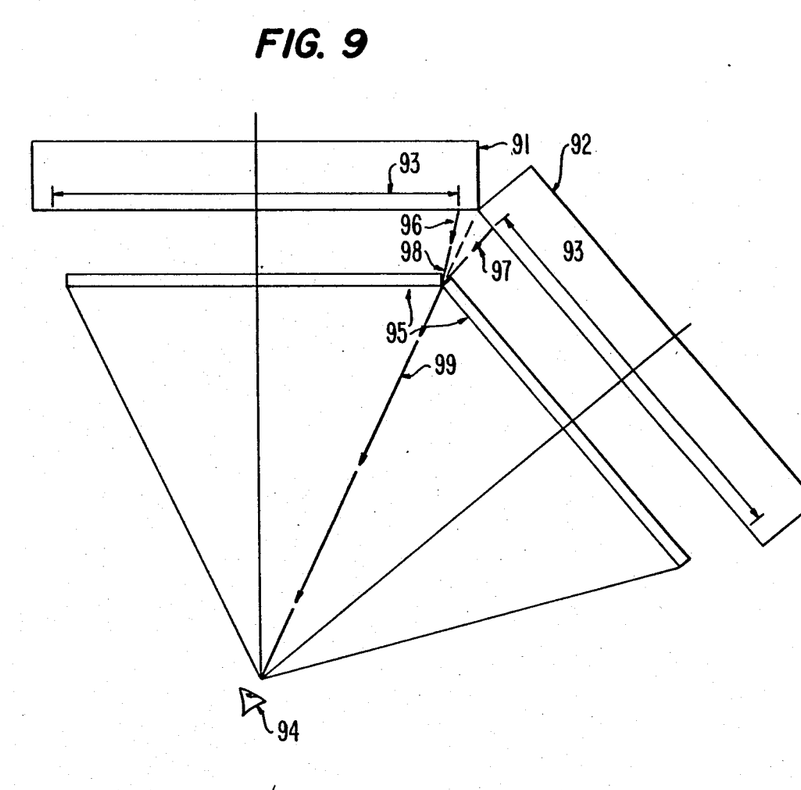
FIG. 9 shows a method of butting two panels together.

In all the above descriptions relative to the invention, a single display panel has been referred to but in the introductory paragraphs it was mentioned that multiple panels could be used to give a large, effectively continuous display without obvious joins in the image. Since the active area of each display panel is surrounded by a frame containing the electronic components, it is not sufficient to mount panels butted together to give a continuous image. FIG. 9 shows a method of obtaining a substantially continuous image for the case where two or more adjacent panels are inclined at an angle to each other, as is the case in a flight simulation display in which the pilot is at least partially enclosed by the display, to give a large total field of view. Although the figure shows butting of two panels horizontally, it is to be understood that the same technique applies to vertical butting.

Two panels 91 and 92 touch along a vertical line and each has an image width 93. Without additional components an observer 94 would see a gap between the images carried by the two panels. Fresnel lenses 95 are mounted in front of the panels 91 and 92. They are the same shape as the panels but slightly smaller and are made of acrylic, embossed with a fine pattern of grooves according to standard practice and give a slight magnification of each image. This is shown by ray 96 from panel 91 and ray 97 from panel 92 meeting at 98 where the lenses touch. The ray 99 shows that rays 96 and 97 become coincident.

The membrane of the present invention, once deflected into a pattern representing a television image, will generally stay deflected for some time after the addressing has been switched off. The time for which the image persists depends primarily on the resistivity of the material of the membrane and supporting structure. This means that there will be virtually no flicker, even for a bright picture. There may also be applications in which parts of the complete image are updated while others remain fixed, for example for strategic military displays.

In a CRT, as the beam current is increased to brighten the image, the beam gets wider and the resolution gets somewhat worse (particularly with a projection tube). With a panel in accordance with the present invention, the information controlling one display element cannot affect adjacent display elements and the resolution should remain substantially constant for all brightness levels.

The described embodiments have been based on 525-line interlaced television but it should be recognized that a different number of lines, such as 1000, may be used, or sequential scanning employed. The invention may also be used with a non-television display, such as an alphanumeric display.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A display device comprising:
    a display element having a light reflective portion and a light transmissive portion,
    a reflector spaced from the display element,
    converging means for converging light reflected by the light reflective portion of the display element onto the reflector and directing the converged light from the reflector through the light transmissive portion of the display element,
    modulation means for modulating the convergence of the light reflected by the light reflective portion of the display element onto the reflector,
    whereby the amount of light directed through the light transmissive portion of the display element is modulated.

2. A display device as in claim 1 wherein the converging means comprises:
    deformation means for deforming the light reflective portion of the display element.

3. A display device as in claim 2 wherein
    the display element further comprises a deformable membrane,
    the light reflective portion of the display element further comprises a metalized coating on the deformable membrane, and
    the deformation means further comprises charging means for electrically charging the metalized coating and electrostatic means for applying an electrostatic force to the metalized coating.

4. A display device as in claim 3 wherein the deformation means further comprises an electrode structure for generating, depositing and removing electric charge in the form of ions on the deformable membrane of the display element.

5. A display device as in claim 4 wherein the electrode structure further comprises:
    an inert gas,
    a first electrode, a second electrode, and a third electrode,
    means for establishing a relative potential between the first electrode and the second electrode to thereby ionize the gas, and
    means for establishing a relative potential between the second electrode and the third electrode to thereby extract ions from the ionized gas and direct the ions to the deformable membrane.

6. A display device as in claim 2 or 3 wherein the light reflective portion of the display element defines a substantially ring-shaped area having a variable radius of curvature and the light transmissive portion of the display element defines a substantially circular area within the substantially ring-shaped area, and wherein the deformation means further comprises means for varying the radius of curvature of the substantially ring-shaped area between infinity and a predetermined minimum value.

7. A device as in claim 6 wherein the ratio of the diameter of the circular area to the diameter of the ring-shaped area is substantially equal to 1:4.

8. A device as in claim 1 further comprising:
a plurality of display elements, wherein the modulation means further comprises:
addressing means for individually addressing each of the plurality of display elements,
whereby the amount of light transmitted through the light transmissive portion of each display element is independently modulated.

9. A device as in claim 8 further comprising:
a color filter having a plurality of red, green and blue transparent areas arranged in an array such that any three adjacent transparent areas form a triad of red, green and blue, each one of the plurality of transparent areas being aligned with a corresponding one of the plurality of display elements.

10. A device as in claim 8 or 9 further comprising:
a light diffusing sheet mounted in proximity to the plurality of display elements for diffusing the light directed through the plurality of display elements.

11. A display device comprising:
a collimated light source,
a display element having a reflective portion for reflecting light from the light source and a transparent portion,
a reflector spaced from the display element,
converging means for converging the light reflected by the reflective portion of the display element onto the reflector and directing the converged light from the reflector through the transparent portion of the display element,
modulation means for modulating the convergence of the light reflected by the reflective portion of the display element,
whereby the amount of light directed through the transparent portion of the display element is modulated.

12. A display device comprising:
a collimated light source,
a display element,
a reflector spaced from the display element and the light source,
reflection means for reflecting light from the display element to the reflector,
transmission means for transmitting light from the reflector through the display element,
converging means for converging light reflected by the reflection means onto the reflector and directing the converged light from the reflector through the transmission means,
modulation means for modulating the convergence of the light reflected by the reflection means,
whereby the amount of light transmitted through the display element is modulated.

13. A device as in claim 12 wherein
the display element comprises a deformable membrane,
the reflection means comprises a reflective coating on the deformable membrane, and
the transmission means comprises a substantially transparent region of the deformable membrane.

14. A display method in a device having a collimated light source, a display element positioned to reflect light from the light source, and a reflector spaced from the display element and the light source, the method comprising the steps of:
converging light reflected by the display element onto the reflector,
directing the converged light from the reflector through the display element, and
modulating the convergence of the light reflected by the display element to the reflector,
whereby the amount of light directed through the display element is modulated.

15. A display method comprising the steps of:
providing a collimated light source,
providing a display element having a substantially reflective portion and a substantially non-reflective portion,
positioning a reflector substantially intermediate the display element and the light source,
reflecting light from the substantially reflective portion of the display element onto the reflector,
converging the light reflected by the substantially reflective portion of the display element onto the reflector,
directing the converged light from the reflector through the substantially non-reflective portion of the display element, and
modulating the convergence of the light reflected by the display element to the reflector,
whereby the amount of light directed through the substantially non-reflective portion of the display element is modulated.

16. A display method comprising the steps of:
providing a display element having a light reflective portion and a light transmissive portion,
positioning a reflector relative to the display element,
converging light reflected by the light reflective portion of the display element onto the reflector and directing the converged light from the reflector through the light transmissive portion of the display element,
modulating the convergence of the light reflected by the light reflective portion of the display element onto the reflector,
whereby the amount of light directed through the transparent portion of the display element is modulated.

17. A display method comprising the steps of:
providing a collimated light source,
providing a display element having a reflective portion for reflecting light from the light source and a transparent portion,
spacing a reflector from the display element,
converging light reflected by the reflective portion of the display element onto the reflector and directing the converged light from the reflector through the transparent portion of the display element,
modulating the convergence of the light reflected by the reflective portion of the display element, whereby the amount of light directed through the transparent portion of the display element is modulated.

18. A display device comprising:
a collimated light source,
a plurality of display elements each having a reflective portion for reflecting light from the light source and a transparent portion,
a reflector spaced from each display element,
converging means for converging the light reflected by the reflective portion of each display element onto the reflector and directing the converged light from the reflector through the transparent portion of the display element,
modulation means for modulating the convergence of the light reflected by the reflective portion of the display element,
whereby the amount of light directed through the transparent portion of each display element is modulated.

* * * * *